(12) United States Patent
Zhadanov et al.

(10) Patent No.: US 8,157,227 B2
(45) Date of Patent: Apr. 17, 2012

(54) DEVICE FOR SUPPORTING AN OBJECT ON A SURFACE

(76) Inventors: Sam Zhadanov, Brooklyn, NY (US); Eli Zhadanov, Brooklyn, NY (US)

( * ) Notice: Subject to any disclaimer, the term of this patent is extended or adjusted under 35 U.S.C. 154(b) by 0 days.

(21) Appl. No.: 12/800,403

(22) Filed: May 15, 2010

(65) Prior Publication Data

US 2011/0278406 A1 Nov. 17, 2011

(51) Int. Cl.
*F16B 47/00* (2006.01)
(52) U.S. Cl. .............. 248/205.5; 248/309.3; 248/206.2; 248/362; 248/683
(58) Field of Classification Search .............. 248/206.2, 248/205.5–205.7, 205.8, 206.3, 207
See application file for complete search history.

(56) References Cited

U.S. PATENT DOCUMENTS

| | | | | |
|---|---|---|---|---|
| 5,087,005 | A * | 2/1992 | Holoff et al. ............... | 248/205.8 |
| 6,502,794 | B1 * | 1/2003 | Ting ........................... | 248/206.2 |
| 7,222,828 | B2 * | 5/2007 | Zhadanov et al. ......... | 248/205.5 |
| 7,226,026 | B2 * | 6/2007 | Lin ............................. | 248/205.5 |
| 7,527,231 | B2 * | 5/2009 | Zhadanov et al. ......... | 248/206.2 |
| 7,850,133 | B2 * | 12/2010 | Carnevali .................... | 248/205.5 |
| 7,878,467 | B2 * | 2/2011 | Chen et al. ................ | 248/206.2 |
| 2010/0282930 | A1 * | 11/2010 | Hsu ............................ | 248/205.5 |

* cited by examiner

*Primary Examiner* — Terrell McKinnon
*Assistant Examiner* — Monica Millner

(57) ABSTRACT

A device for supporting an object on a surface has a body including a first portion attachable to a surface so as to attach the body to the surface and a second part having a receptacle for receiving the object, and an element for simultaneously activating the first portion and the second portion so as to simultaneously attach the first portion of the body to the surface and to fix the object in the receptacle.

2 Claims, 2 Drawing Sheets

C–C

C-C

DEVICE FOR SUPPORTING AN OBJECT ON A SURFACE

BACKGROUND OF THE INVENTION

The present invention relates to devices for supporting objects on a surface.

Devices of the above mentioned general type are known in the art. One of the known devices includes a body with a suction cup attachable to a surface, on which an object is to be supported. In order to support the object it is necessary to connect the object with the suction element by connecting additional means. It is believed that the devices of this type can be further improved.

SUMMARY OF THE INVENTION

Accordingly, it is an object of the present invention to provide the device for supporting an object on a surface, which is a further improvement of the existing devices.

In keeping with these objects and with others which will become apparent hereinafter, one feature of the present invention resides, briefly stated, in a device for supporting an object on a surface, comprising a body including a first portion attachable to a surface so as to attach said body to the surface and a second portion having a receptacle for receiving the object; and means for simultaneously activating said first portion and said second portion so to simultaneously attach said first portion of said body to the surface and to fix the object in the receptacle.

Another feature of the present invention resides in first action means acting on said first portion of said body, and wherein said activating means act on said first action means to activate said first portion on said body and to attach it to the surface.

A further feature of the present invention resides in second action means acting on said second portion of said body, and wherein said activating means act on said second action means to fix the object in the receptacle of said second portion of said body.

A further feature of the present invention resides said first action means in said first portion of said body including a suction element and a displacing member acting on said suction element to attach said first portion of said body to the surface, and wherein said activating means act on said displacing element.

A further feature of the present invention resides in said second action means in said second portion including said receptacle and a displacing member displaceable so that at least partially extend into said receptacle and abut against the object and wherein said activating means displaces said displacing member.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
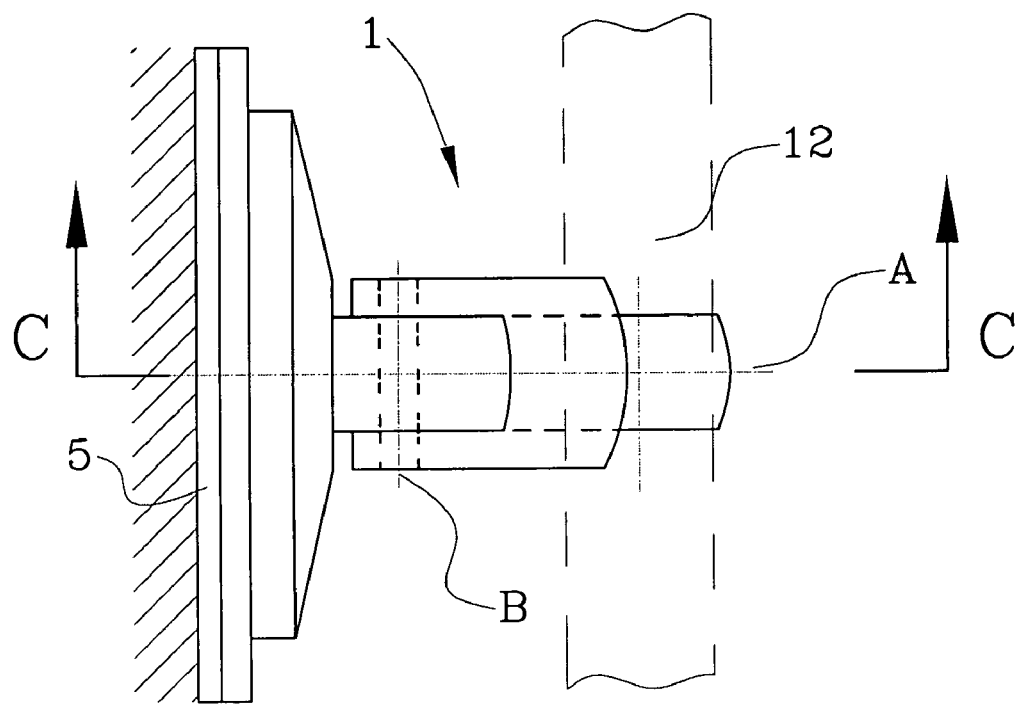
FIG. 1 is a top view of a device for supporting an object on a surface.
Figure 2:
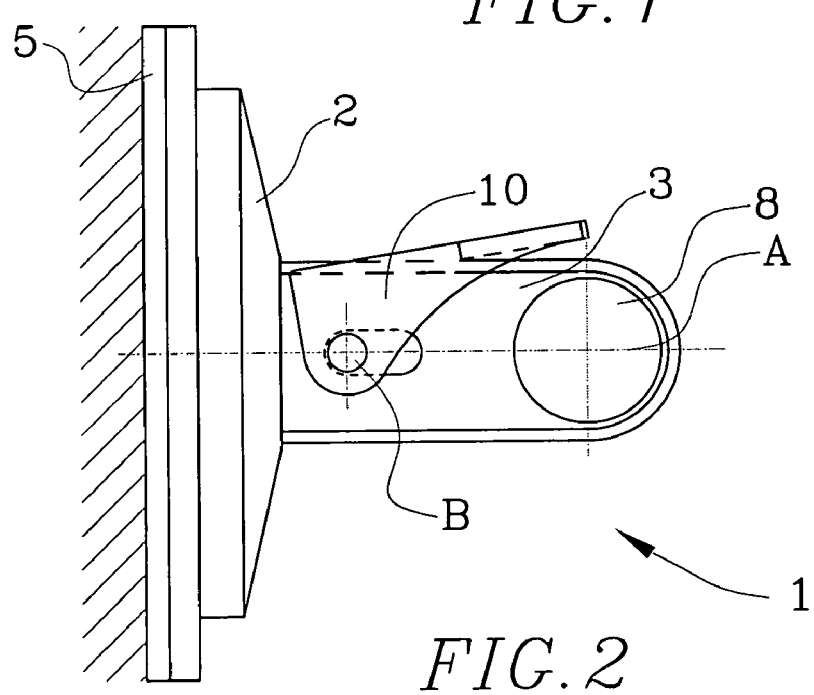
FIG. 2 is a side view of a device for supporting an object on a surface.
Figure 3:
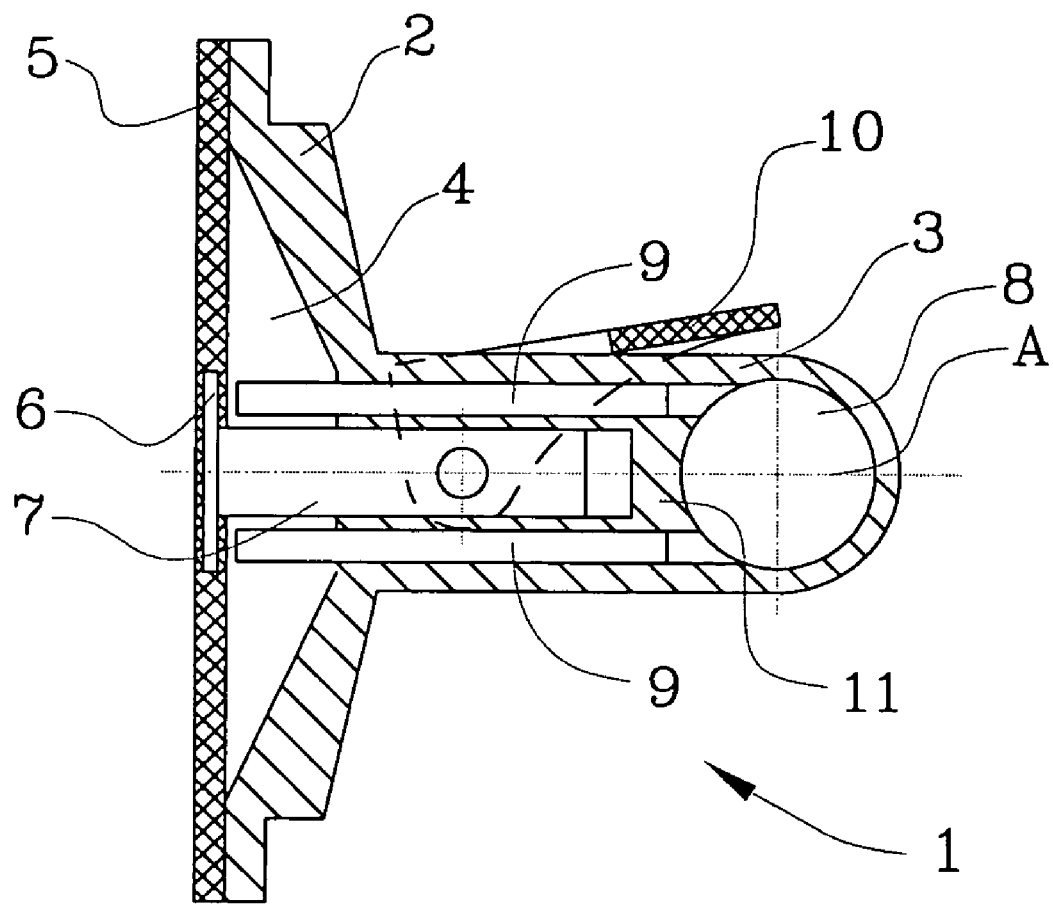
FIG. 3 is a device showing a cross-section of a device for supporting an object on a surface.

A device for supporting an object in accordance with the present invention has a body which is identified as a whole with reference numeral 1. The body 1 has a first portion identified with reference numeral 2 and a second portion identified with reference numeral 3. The portion 2 is provided for attaching to a surface, for example to a wall and the like. The portion 3 is provided for directly holding an object.

The portion 2 can be cup-shaped and can have a cup shaped casing 4. It is provided with an elastic element 5 connected to a central disk 6 which in turn is connected with a rod 7 displaceable in a direction of axis A and forming first action means.

The portion 3 has a central opening 8 which can receive an object for example a hollow holder of a showerhead, a hose and the like, and is provided with displaceable means, for example with two displacing rods 9 which are also displaceable in the direction of the axis A and form second action means.

In accordance with the present invention activating means 10 are provided. The activating means 10 can be formed for example as a lever turnable by a user on an axis B. The lever is engaged with the displacing member 7 and with the displacing rods 9, in particular through an element 11.

When the lever 10 is turned by a user, it displaces the displacing member 7 which through the disk 6 presses the elastic cup 5 against the mounting surface so that it is attached to the mounting surface, and simultaneously it displaces the displacing rods 9 so that they extend into the receptacle 8 and abut against the object formed for example as a tubular member 12 inserted in the receptacle 8, so that the tubular member 12 is firmly retained in the receptacle. Therefore, the single displacing element 10 acts on the first and second action means and provides simultaneously the attachment of the device to the surface and the fixing of the device with the object to be supported.

It will be understood that each of the elements described above, or two or more together, may also find a useful application in other types of constructions differing from the type described above.

While the invention has been illustrated and described as embodied in a device for supporting an object on a surface, it is not intended to be limited to the details shown, since various modifications and structural changes may be made without departing in any way from the spirit of the present invention.

Without further analysis, the foregoing will so fully reveal the gist of the present invention that others can, be applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A device for supporting an object on a surface, comprising a body including a first portion attachable to a surface so as to attach said body to the surface and a second portion having a receptacle for receiving the object; first rod-shaped action means acting on said first portion of said body; second rod-shaped action means that is separate from said first means and separately acting on second portion of said body and means for simultaneously activating said first portion and said second portion so as simultaneously to attach said first portion of said body to the surface and to fix the object in the receptacle, wherein said activating means act on said first means to attach said first portion to the surface and act on said separate action means to fix the object in the receptacle of said second portion, wherein said first action means has a first rod which is displaceable axially towards said first portion of said body when said activating means is actuated and acts on said first portion of said body, while said second action means have second rods which located around said first rod and are displaced axially opposite to said first rod towards said second portion of said body when said activating means is actuated and both extend into said receptacle to abut to against the object and to firmly retain the object in said receptacle.

2. A device as defined in claim 1, wherein said body has an inner passage in which said first rod displaces, and an outer passage which is radially spaced from said inner passage and in which said second rods are displaceable.

\* \* \* \* \*